(12) United States Patent
Park et al.

(10) Patent No.: US 9,569,020 B2
(45) Date of Patent: *Feb. 14, 2017

(54) FLEXIBLE TOUCH SCREEN PANEL

(71) Applicant: SAMSUNG DISPLAY CO., LTD., Yongin-si, Gyeonggi-do (KR)

(72) Inventors: Jung-Mok Park, Yongin-si (KR); Kwan-Young Han, Yongin-si (KR); Mikiya Itakura, Yongin-si (KR); Hyung-Chul Kim, Yongin-si (KR); Chang-Bum Kim, Yongin-si (KR); Jae-Hyung Jo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 251 days.

This patent is subject to a terminal disclaimer.

(21) Appl. No.: 13/717,617

(22) Filed: Dec. 17, 2012

(65) Prior Publication Data
US 2014/0028584 A1 Jan. 30, 2014

(30) Foreign Application Priority Data
Jul. 30, 2012 (KR) .................. 10-2012-0083224

(51) Int. Cl.
*G06F 3/041* (2006.01)
(52) U.S. Cl.
CPC ..... *G06F 3/041* (2013.01); *G06F 2203/04102* (2013.01); *Y10S 977/762* (2013.01)
(58) Field of Classification Search
CPC ...................................................... G06F 3/041

USPC ........................................................... 345/173
See application file for complete search history.

(56) References Cited

U.S. PATENT DOCUMENTS

| 6,771,327 | B2 * | 8/2004 | Sekiguchi .................. 349/12 |
| 8,659,575 | B2 * | 2/2014 | Ahn .............................. 345/174 |
| 8,686,967 | B2 * | 4/2014 | Ku et al. ..................... 345/174 |
| 8,686,968 | B2 * | 4/2014 | Park et al. .................. 345/174 |
| 8,741,159 | B2 * | 6/2014 | Lee et al. ..................... 216/13 |
| 8,766,931 | B2 * | 7/2014 | Westhues et al. .......... 345/173 |
| 2002/0054261 | A1 * | 5/2002 | Sekiguchi .................. 349/122 |
| 2007/0285601 | A1 * | 12/2007 | Hendrix et al. ............ 349/117 |
| 2008/0165158 | A1 | 7/2008 | Hotelling et al. |
| 2008/0283799 | A1 | 11/2008 | Alden et al. |
| 2010/0182253 | A1 * | 7/2010 | Park et al. .................. 345/173 |
| 2011/0012845 | A1 * | 1/2011 | Rothkopf et al. .......... 345/173 |
| 2011/0102346 | A1 | 5/2011 | Orsley et al. |
| 2011/0134073 | A1 * | 6/2011 | Ahn ............................. 345/174 |

(Continued)

FOREIGN PATENT DOCUMENTS

KR 10-2007-0097241 4/2007
KR 10-2008-0066658 7/2008

(Continued)

*Primary Examiner* — Afroza Chowdhury
(74) *Attorney, Agent, or Firm* — Lewis Roca Rothgerber Christie LLP

(57) ABSTRACT

A flexible touch screen panel in which metal wire sensing patterns are formed as a touch sensor on a first surface of a flexible thin film is provided. The flexible touch screen panel includes a thin film divided into an active area and a non-active area adjacent to the active area, sensing patterns in the active area on a first surface of the thin film, and sensing lines in the non-active area on the first surface of the thin film and connected to the sensing patterns. The sensing patterns include nanowire.

13 Claims, 3 Drawing Sheets

(56) References Cited

U.S. PATENT DOCUMENTS

| | | | |
|---|---|---|---|
| 2011/0227858 A1* | 9/2011 | An et al. | 345/174 |
| 2011/0273394 A1 | 11/2011 | Young et al. | |
| 2011/0279390 A1* | 11/2011 | Park et al. | 345/173 |
| 2011/0279763 A1* | 11/2011 | Cho et al. | 349/139 |
| 2012/0097514 A1* | 4/2012 | Ku et al. | 200/512 |
| 2012/0113032 A1* | 5/2012 | Itakura et al. | 345/173 |
| 2012/0120003 A1* | 5/2012 | Lee et al. | 345/173 |
| 2012/0139848 A1* | 6/2012 | Lee et al. | 345/173 |
| 2012/0146922 A1* | 6/2012 | Kang et al. | 345/173 |
| 2012/0147467 A1 | 6/2012 | Park | |
| 2012/0286312 A1* | 11/2012 | Hatano et al. | 257/98 |
| 2012/0306777 A1* | 12/2012 | Kang et al. | 345/173 |
| 2012/0313877 A1* | 12/2012 | Han | 345/173 |
| 2013/0002569 A1* | 1/2013 | Kang et al. | 345/173 |
| 2013/0181944 A1* | 7/2013 | Lee et al. | 345/174 |
| 2013/0278511 A1* | 10/2013 | Kang et al. | 345/173 |
| 2013/0285938 A1* | 10/2013 | Kang et al. | 345/173 |

FOREIGN PATENT DOCUMENTS

| | | |
|---|---|---|
| KR | 10-2009-0101292 | 9/2009 |
| KR | 10-2010-0084258 | 7/2010 |
| KR | 10-2010-0124016 | 11/2010 |
| KR | 10-1096559 | 12/2011 |
| KR | 10-2012-0065686 | 6/2012 |

\* cited by examiner

FLEXIBLE TOUCH SCREEN PANEL

CROSS-REFERENCE TO RELATED APPLICATION

This application claims priority to and the benefit of Korean Patent Application No. 10-2012-0083224, filed on Jul. 30, 2012 in the Korean Intellectual Property Office, the entire content of which is incorporated herein by reference.

BACKGROUND

1. Field

Aspects of embodiments of the present invention relate to a touch screen panel and, more particularly, to a flexible touch screen panel.

2. Description of the Related Art

A touch screen panel is an input device capable, for example, of inputting a user's instruction by selecting instruction contents displayed on a screen of an image display device, or the like, with, for example, a human hand or an object. To this end, the touch screen panel may be provided on a front surface of the image display device to convert a contact position directly contacted by the human hand or the object into an electric signal. The instruction contents selected at the contact position is then recognized as an input signal. Since the touch screen panel may be substituted for a separate input device that operates by being connected to the image display device, such as a keyboard or a mouse, application fields thereof have been gradually extended.

Implementation types of touch screen panels include resistive type touch screen panels, photosensitive type touch screen panels, capacitive type touch screen panels, and the like. Among them, the capacitive type touch screen panels operate by sensing a change in capacitance formed between conductive sensing patterns and neighboring other sensing patterns or a ground electrode, or the like, when a human hand or an object contacts the touch screen panel, thereby converting a contact position into an electric signal.

A touch screen panel as described above may be attached to an outer surface of the image display device, such as a liquid crystal display device or an organic light emitting display device, as part of a product manufacturing process. Therefore, the touch screen panel may benefit from characteristics such as high transparency and a thin profile. In addition, flexible image display devices have been recently developed. As such, touch screen panels attached to the flexible image display may also benefit from being flexible.

However, in order to form sensing patterns for implementing a touch sensor in the capacitive type touch screen panel, processes such as thin film forming, pattern forming, or the like, may be used. Therefore, the capacitive type touch screen panel may require properties such as high heat resistance and chemical resistance, or the like. However, capacitive type touch screen panels (that use, for example, sensing patterns or the like) have been formed on glass substrates. Since glass substrates should have sufficient thickness (for example, thickness of a predetermined value or more) to function properly as substrates (for example, be capable of being carried in the manufacturing process), characteristics such as sufficient thinness and flexibility may not be satisfied.

In addition, sensing patterns of capacitive type touch screen panels have been made of indium tin oxide (ITO), but metal oxide films such as ITO may be easily damaged by warping or other physical stresses. Further, high deposition temperature and/or high annealing temperature may be needed to provide proper conductivity of the metal oxide film. However, adhesion of the metal oxide film to a substrate in which moisture is easily absorbed, such as a plastic or organic substrate that is used as a flexible substrate (for example, a polycarbonate substrate), may deteriorate.

In addition, a polarizing plate may be attached to the outer side of the image display device in order to improve outdoor visibility or the like. When a touch screen panel is attached to an upper portion of the image display device, the polarizing plate may be attached to an outer surface of the touch screen panel. Further, the polarizing plate and the touch screen panel may go through processes in which they are each separately manufactured and then bonded or assembled together. However, this may lead to problems in the touch screen panel, such as an increase in overall thickness, a reduction in process efficiency, a reduction in yield, or the like.

SUMMARY

Embodiments of the present invention provide for a flexible touch screen panel in which metal wire sensing patterns are formed as a touch sensor on a first surface of a flexible thin film. Additional embodiments provide for a flexible touch screen panel in which a coating type polarizing layer is formed on a second surface of the thin film. This can lead, for example, to improved flexibility, reduced thickness, and improved image visibility.

According to an exemplary embodiment of the present invention, a flexible touch screen panel is provided. The flexible touch screen panel includes a thin film having an active area and a non-active area adjacent to the active area, sensing patterns in the active area on a first surface of the thin film, and sensing lines in the non-active area on the first surface of the thin film and connected to the sensing patterns. The sensing patterns include nanowire.

The sensing patterns may include first sensing cells connected to each other in a first direction, first connecting lines connecting adjacent said first sensing cells to each other in the first direction, second sensing cells connected in a second direction crossing the first direction, and second connecting lines connecting adjacent said second sensing cells to each other in the second direction.

The first and second sensing cells may include a stacked structure of a photosensitive organic layer and a conductive layer.

The conductive layer may include silver nanowire (AgNW).

The conductive layer may be patterned in a region between the first and second sensing cells to expose the photosensitive organic layer.

The flexible touch screen panel may further include an insulating layer at crossing regions of the first and second connecting lines.

The first connecting lines may be on the insulating layer and include a stacked structure of a conductive layer and a photosensitive organic layer.

The conductive layer may include silver nanowire (AgNW).

The flexible touch screen panel may further include a polarizing layer coated on a second surface of the thin film.

The polarizing layer may include a thin crystal film polarizer.

The thin film may include a retardation film.

The thin film may be a quarter-wave plane having a retardation function and including a polycarbonate (PC) film, an oriented polypropylene (OPP) film, or a poly vinyl alcohol (PVA) film.

The retardation film may include a stacked structure of a plurality of retardation films.

Retardation values of the plurality of retardation films may be different from each other.

The thin film may include a retardant polycarbonate (PC) film or a cyclic polyolefin (COP) film.

BRIEF DESCRIPTION OF THE DRAWINGS

The accompanying drawings, together with the specification, illustrate exemplary embodiments of the present invention and, together with the description, serve to explain aspects and principles of the present invention.

DETAILED DESCRIPTION

Figure 1:
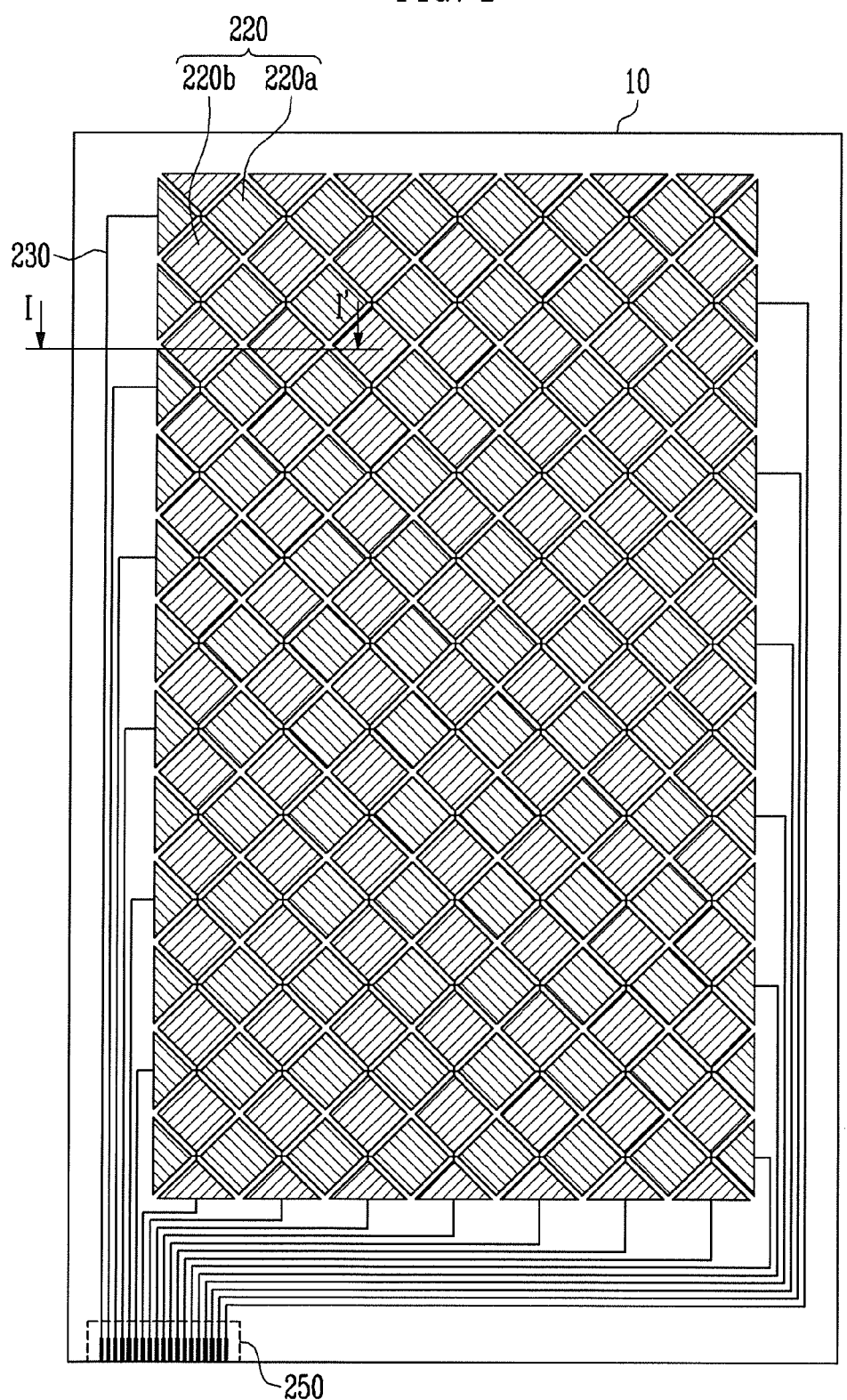
FIG. 1 is a plan view schematically showing a touch screen panel according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being on another element, it may be directly on the other element or indirectly on the other element with one or more intervening elements therebetween. Further, when an element is referred to as being "connected to" another element, it may be directly connected to the other element or be indirectly connected to the other element with one or more intervening elements therebetween. Hereinafter, like reference numerals refer to like elements. Exemplary embodiments of the present invention will now be described in detail with reference to the accompanying drawings.

Figure 2:
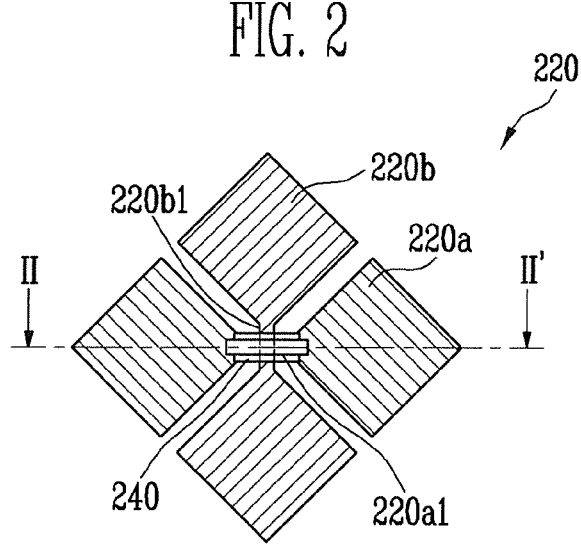
FIG. 2 is an enlarged view illustrating an example embodiment of some of the sensing patterns shown in FIG. 1.
Figure 3A:
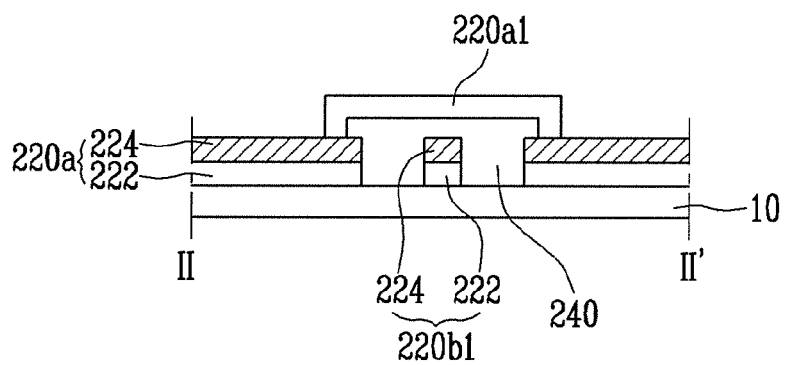
FIGS. 3A to 3C are cross sectional views showing exemplary embodiments of a cross section II-II' of the sensing patterns shown in FIG. 2.
Figure 3B:
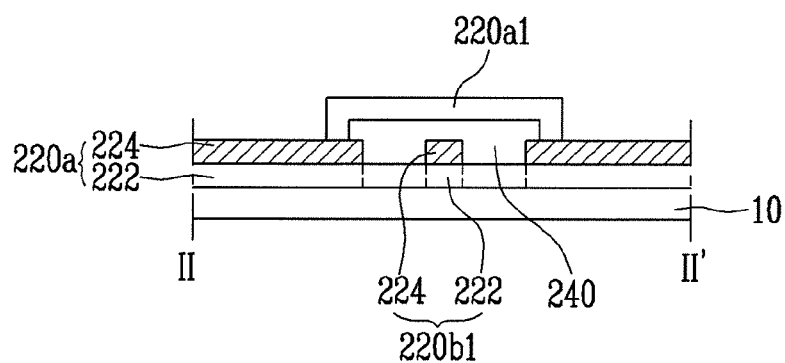
Figure 3C:
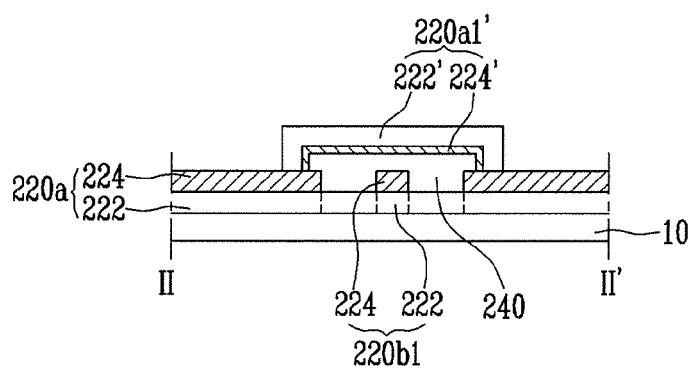
Figure 4:
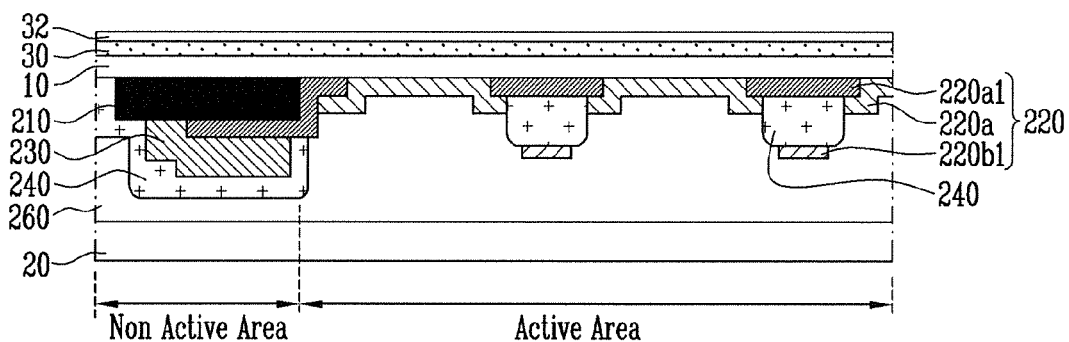
FIG. 4 is a cross sectional view showing an example embodiment of a region I-I' of the touch screen panel shown in FIG. 1.

FIG. 1 is a plan view schematically showing a touch screen panel according to an exemplary embodiment of the present invention. FIG. 2 is an enlarged view illustrating an example embodiment of some of the sensing patterns 220 shown in FIG. 1. FIGS. 3A to 3C are cross sectional views showing exemplary embodiments of a cross section II-II' of the sensing patterns 220 shown in FIG. 2. FIG. 4 is a cross sectional view showing an example embodiment of a region I-I' of the touch screen panel shown in FIG. 1.

Referring to FIGS. 1 to 4, the touch screen panel includes a flexible thin film 10, sensing patterns 220 formed on a first surface of the thin film 10, and sensing lines 230 connecting the sensing patterns 220 to an external driving circuit via a pad part 250. The flexible thin film 10 is a transparent base, for example, polyethyleneterephthalate (PET), retardant polycarbonate (PC), cyclic polyolefin (COP), polyimide (PI), polymethylmethacrylate (PMMA), triacetyl cellulose (TAC), ARTON, or the like.

FIG. 4 shows a coating type polarizing layer 30 formed on a second surface of the thin film 10. In this case, the thin film 10 may serve as a retardation film. When the thin film 10 serves as a retardation film, it may be implemented as a quarter-wave plane having a retardation function, for example, a polycarbonate (PC) film, an oriented polypropylene (OPP) film, or a poly vinyl alcohol (PVA) film. Further, this thin film 10 may provide a phase difference (retardation) in time to light polarized by the coating type polarizing layer 30 formed on the second surface of the thin film 10 to make a left-circular or right-circular polarization of incident light, such that the incident light is converted into circular-polarized or almost circular-polarized light.

In the exemplary embodiment of FIG. 4, the thin film 10 is implemented as a layer. In other embodiments, the thin film 10 may be implemented as a plurality of retardation films in a stacked structure. Here, retardation values of the different retardation films may be set different from each other to secure an improved or optimal black characteristic of light going through the coating type polarizing layer 30. Regardless of the retardation function, embodiments of the present invention secure the flexibility of the thin film 10 by keeping its thickness between 0.005 mm and 0.05 mm (that is, between 5 μm and 50 μm).

In addition, in the exemplary embodiment of FIG. 4, the coating type polarizing layer 30 is formed on the thin film 10, such that a thickness thereof is significantly reduced compared to that of a touch screen panel using a prefabricated polarizing plate. This is because a comparable polarizing plate includes three layers, such as a triacetyl cellulose (TAC) layer, a poly vinyl alcohol (PVA) layer, and another TAC layer. Each TAC layer has a thickness of about 20 μm while the PVA layer has a thickness of about 80 μm. Therefore, an overall thickness of the polarizing plate is about 120 μm, which is significantly more than the thickness of the above-described thin film 10. Thus, when such a polarizing plate is attached to the touch screen panel with the above-mentioned thin film 10, it runs counter to the overall thinness of the touch screen panel.

Therefore, in the exemplary embodiment of FIG. 4, in order to implement the function of the polarizing plate and lessen or minimize the thickness of the touch screen panel, the coating type polarizing layer 30 is directly formed on the second surface (that is, an upper surface) of the thin film 10. Here, the coating type polarizing layer 30 may be formed in various structures and various schemes, such as a thin crystal film polarizer, by way of example. In the exemplary embodiment of FIG. 4, the thin crystal film polarizer 30 has a thickness of 5 μm or less. Accordingly, the corresponding touch screen panel has a significantly reduced thickness compared to a comparable touch screen panel using a prefabricated polarizing plate.

As an example, the thin crystal film polarizer 30 may have a special molecular crystal structure resulting from crystallization of liquid crystalline material. The thin crystal film polarizer 30 may be formed, for example, by applying the liquid crystalline material to the thin film 10, aligning, and drying the liquid crystal material.

The liquid crystalline material may include at least one organic material capable of forming a stable lyotropic or thermotropic liquid crystalline phase. The organic material includes at least an organic compound, and a chemical formula thereof may include (i) at least an ionogenic group for securing solubility in polar solvents in order to obtain the lyotropic liquid crystalline phase, (ii) at least a nonionogenic group for securing solubility in non-polar solvents in order to obtain the lyotropic liquid crystalline phase, and/or at least a counterion that may be contained or not contained in a molecular structure after forming the film.

An optically anisotropic dichromatic crystal film may include a plurality of supramolecular complexes made of one or several organic compounds. The supramolecular complexes are biased in a specific scheme to provide polarization and conductivity of light. The film is formed of a rod-like supramolecule and the supramolecule includes at least one of disk-shaped polycyclic organic compounds having a conjugated π-system. The film has intervals of 0.3 Å to 3.4 Å between molecules in a polarization axis and an orderly crystal structure as a whole.

A base material of the optically anisotropic dichromatic crystal film is connected to a pair coupling system and selected based on presence of a group of amine, phenol, ketone, or the like, placed on a molecular plane, and on presence of a developed TT pair coupling system of a pair aromatic cyclic. The molecules and/or molecular fragments have a flat structure. The base material may be, for example, indanthrone (Vat blue 4), 1,4,5,8-perylenetetracaboxylic debenzimidazole (Vat Red 14), 3,4,9,10-perylenetetracaboxylic debenzimidazole, quinacridone (pigment violet 19), or the like, and a derivative (of the base material or of compounds thereof) may form a stable lyotropic liquid crystalline phase.

In the optically anisotropic dichromatic crystal film, the molecular surfaces are parallel with each other, and the molecules form a three-dimensional crystal structure in at least part of the crystal film. From a customized or optimized manufacturing technology, the optically anisotropic dichromatic single crystal film may be formed. An optical axis of the single crystal is perpendicular to the molecular plane. The above-mentioned thin crystal film has high degree of anisotropy and indicates a high refractive index and/or a high absorption coefficient.

Thus, as shown in FIGS. 1 and 4, the exemplary touch screen panel has a structure in which the coating type polarizing layer 30 is formed on the top surface of the thin film 10 and sensing patterns 220 and the sensing lines 230 are formed on the bottom surface of the thin film 10. Through the structure described above, a flexible touch screen panel formed integrally with the coating type polarizing layer 30 may be implemented.

In addition, a functional coating layer 32 may be further formed on the top surface of the coating type polarizing layer 30. The functional coating layer 32 may be, for example, a hard coating layer, an anti-reflection layer, an anti-contamination layer, or the like, or may be implemented in a structure in which two of more layers of the layers described above are stacked. A configuration of the touch screen panel according to an exemplary embodiment of the present invention will now be described.

As shown in FIG. 2, the sensing patterns 220 include a plurality of first sensing cells 220a connected in a row direction for each row, first connecting lines 220a1 connecting the first sensing cells 220a to each other in the row direction, second sensing cells 220b connected in a column direction for each column, and second connecting lines 220b1 connecting the second sensing cells 220b to each other in the column direction. Although FIG. 2 shows a portion of the sensing patterns 220 for convenience, the touch screen panel has a structure in which the sensing patterns 220 shown in FIG. 2 are repeatedly arranged, as illustrated in FIG. 1.

The first and second sensing cells 220a and 220b are alternatively arranged and nonoverlapping with each other, and the first and second connecting lines 220a1 and 220b1 cross each other. Here, the first and second connecting lines 220a1 and 220b1 have an insulating layer 240 therebetween in order to secure stability, for example.

Sensing cells for comparable touch screen panels include transparent metal oxide films, such as an ITO film. However, since the metal oxide films are relatively hard or rigid, curvature radii thereof are limited, such that they are difficult to apply to flexible products that are bent or folded with a small radius. In addition, when the thin film 10 is used as a base as described in the exemplary embodiment of FIG. 4, its resistance to high temperature makes it difficult to form the ITO pattern.

Therefore, in an exemplary embodiment of the present invention, the first and second sensing cells 220a and 220b are implemented as nanowire having excellent flexibility. In one exemplary embodiment, silver nanowire (AgNW) is used as an example. That is, sensing patterns 220 have first and second sensing cells 220a and 220b made of AgNW formed integrally with the first and second connecting lines 220a1 and 220b1, respectively, or are formed separately from the first and second sensing cells 220a and 220b and electrically connected thereto.

In one example embodiment, the second sensing cells 220b are patterned integrally with the second connection lines 220b1 in the column direction, and the first sensing cells 220a are patterned between the second sensing cells 220b in an independent pattern and connected to each other in the row direction by the first connecting lines 220a1 positioned at the upper or lower portion thereof. Here, the first connecting lines 220a1 may directly contact the first sensing cells 220a at an upper or lower portion of the first sensing cells 220a to electrically connect thereto, or electrically connect to the first sensing cells 220a through contact holes, or the like. The first connecting lines 220a1 may be made of the same material as the first sensing cells 220a (such as AgNW), or may be made of a transparent conductive material such as ITO or an opaque low resistance metal material but have an adjusted width, or the like, in order to obscure or prevent visualization of the pattern.

In addition, the sensing lines 230 as shown in FIG. 1 are connected to the first sensing cells 220a in units of rows and the second sensing cells 220b in units of columns to connect the first and second sensing cells 220a and 220b to an external driving circuit such as a position detecting circuit through the pad unit 250. The sensing lines 230, which are located in the non active area as shown in FIG. 1 (that is, the outer side portion of the active area in which images are displayed, such as an area adjacent to the active area), have a wide choice of materials from which they can be fabricated. Therefore, in addition to the transparent conductive material used to form the sensing patterns 220, the sensing lines 230 may be formed of a low resistance metal material such as molybdenum (Mo), silver (Ag), Titanium (Ti), copper (Cu), aluminum (Ti), molybdenum/aluminum/molybdenum (Mo/Al/Mo), and the like.

The touch screen panel as described above is a capacitive type touch panel. When a contact object such as a human hand, a stylus pen, or the like, contacts the touch panel, a change in capacitance according to a contact position is transferred from the sensing patterns 220 to the driving circuit via the sensing lines 230 and the pad unit 250. In this case, the change in capacitance is converted into an electrical signal by X and Y input (for example, row and column) processing circuits, or the like, such that the contact position is recognized.

In the sensing patterns 220, the AgNW is implemented by a mixed structure of the photosensitive organic layer and the conductive layer and patterned into the first and second sensing cells 220a and 220b. Here, the conductive layer indicates a network layer of AgNW providing a conductive medium of the transparent conductor. That is, as shown in FIGS. 3A to 3C, the first sensing cells 220a are implemented as a stacked structure of a photosensitive organic layer 222 and a conductive layer 224. In addition, the second sensing cells 220b (see FIG. 2) and the second connecting lines 220b1 are implemented as the stacked structure. Further, the first connecting lines 220a1 connecting the first sensing cells 220a to each other are made of ITO, transparent low resistance metal, or the like, rather than AgNW.

In the exemplary embodiments of FIGS. 1-4, in patterning each of the first and second sensing cells 220a and 220b to have an independent pattern, the regions between the first and second sensing cells 220a and 220b are removed. That is, the photosensitive organic layer 222 and the conductive layer 224 formed in the regions between the first and second sensing cells 220a and 220b are removed. However, when the photosensitive organic layer 222 and the conductive layer 224 corresponding to the removed regions are removed, the pattern of the region may become visible to a user's eyes (due to, for example, a pattern step).

Therefore, in FIG. 3B, to address the above-mentioned visibility, patterning is performed so that in the region between the first and second sensing cells 220a and 220b only the conductive layer 224 having electrical conductivity is removed and the photosensitive organic layer 222 positioned under the conductive layer 224 is left. Remaining components of FIG. 3B are the same as those in FIG. 3A. Therefore, the same reference numerals are used to identify the same components. That is, according to the exemplary embodiment shown in FIG. 3B the pattern step is reduced or minimized, thereby making it possible to overcome the pattern visibility that may take place in the structure of FIG. 3A.

Finally, an exemplary embodiment of FIG. 3C is different from that of FIG. 3B in that the first connecting lines 220a1' of FIG. 3C are made of AgNW, which is the same material as that of the first and second sensing cells 220a and 220b. However, the first connecting lines 220a1' are implemented in an inversely stacked structure, that is, a stacked structure of the conductive layer 224' and the photosensitive organic layer 222' as shown in FIG. 3C. Through this structure the conductive layer 224 of the first sensing cells 220a and the conductive layer 224' of the first connecting lines 220a1' are electrically connected to each other.

The cross-sectional view of FIG. 4 shows part of a non active area and part of an active area of the touch screen panel formed on a first surface of the flexible thin film 10. Here, on a second surface of the thin film 10 the coating type polarizing layer 30 is formed. Further, as described above, on the coating type polarizing layer 30 a functional coating layer 32 may be further formed.

In addition, in FIG. 4, a display device 20 is attached to a lower surface of the touch screen panel, that is, the first surface of the thin film 10 by a transparent adhesive layer 260 is shown. Here, the display device 20, which is a flexible display device, may be implemented as an organic light emitting display device. Further, the transparent adhesive layer 260 may be made of a transparent adhesive material having high light transmissivity, for example, a super view resin (SVR), an optical cleared adhesive (OCA), or the like.

Referring to FIG. 4, the sensing patterns 220 formed on an active region of a first surface of the thin film 10 include first sensing cells 220a connected to each other for each row line in a first (e.g., row) direction, first connecting lines 220a1 connecting the first sensing cells 220a to each other in the row direction, second sensing cells 220b (see FIG. 1) connected to each other for each column line in a second (e.g., column) direction, and second connecting lines 220b1 connecting the second sensing cells 220b to each other in the column direction. In addition, an insulating layer 240 is formed or located between the first connecting lines 220a1 and the second connecting lines 220b1 at a crossing region therebetween.

Although a thickness of each of the components, such as the sensing patterns 220 and the like, configuring the touch screen panel is exaggerated for convenience of explanation in FIG. 4; an actual thickness of the each component is significantly smaller than the thickness shown in FIG. 4. In addition, although the first and second sensing cells 220a and 220b are shown as a layer in FIG. 4, they may be implemented with a stack structure of a photosensitive organic layer 222 and a conductive layer 224 as illustrated in FIGS. 3A to 3C.

In FIG. 4, the inactive region positioned at the outer side portion of the active region is formed with black matrix 210 and sensing lines 230 overlapping with the black matrix 210 and electrically connected to the sensing patterns 220. Here, the black matrix 210 serves to form an edge part of a display region while preventing patterns of sensing lines and the like, formed in the inactive region from being visible.

According to the exemplary embodiment of FIG. 4, the flexible touch screen panel is positioned between the display device 20 and the coating type polarizing layer 30, thereby obscuring or preventing the visibility of the sensing patterns, and reducing or minimizing reflectivity while still maintaining flexibility. As set forth above, the coating type polarizing layer is formed on the flexible thin film, and sensing patterns (for a touch sensor) implemented as metal nanowire are formed on the bottom surface of the thin film, thereby making a flexible touch screen panel having reduced thickness and improved image visibility.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flexible touch screen panel comprising:
  a thin film having a rectangular active area extending in a row direction and a column direction, and a non-active area adjacent to the active area;
  nanowire sensing cells each comprising a first stacked structure comprising a same first conductive layer and a same first photosensitive organic layer between a first surface of the thin film and the first conductive layer, the nanowire sensing cells comprising:
    first nanowire sensing cells connected to each other in rows in the row direction; and
    second nanowire sensing cells electrically insulated from the first nanowire sensing cells and connected to each other in columns in the column direction;
  first nanowire connecting lines connecting row-wise adjacent said first nanowire sensing cells to each other;

second nanowire connecting lines connecting column-wise adjacent said second nanowire sensing cells to each other; and sensing lines in the non-active area on the first surface of the thin film and connected to the rows of first nanowire sensing cells and the columns of second nanowire sensing cells, wherein the first conductive layer is patterned in a region between the first and second nanowire sensing cells to expose the first photosensitive organic layer.

2. The flexible touch screen panel according to claim 1, wherein the first conductive layer comprises silver nanowire (AgNW).

3. The flexible touch screen panel according to claim 1, further comprising an insulating layer at crossing regions of the first and second nanowire connecting lines.

4. The flexible touch screen panel according to claim 1, further comprising a polarizing layer coated on a second surface of the thin film.

5. The flexible touch screen panel according to claim 4, wherein the polarizing layer comprises a thin crystal film polarizer.

6. The flexible touch screen panel according to claim 1, wherein the thin film comprises a retardation film.

7. The flexible touch screen panel according to claim 6, wherein the thin film is a quarter-wave plane having a retardation function and comprising a polycarbonate (PC) film, an oriented polypropylene (OPP) film, or a poly vinyl alcohol (PVA) film.

8. The flexible touch screen panel according to claim 6, wherein the retardation film comprises a stacked structure of a plurality of retardation films.

9. The flexible touch screen panel according to claim 8, wherein retardation values of the plurality of retardation films are different from each other.

10. The flexible touch screen panel according to claim 1, wherein the thin film comprises a retardant polycarbonate (PC) film or a cyclic polyolefin (COP) film.

11. A flexible touch screen panel comprising:

a thin film having a rectangular active area extending in a row direction and a column direction, and a non-active area adjacent to the active area;

nanowire sensing cells each comprising a first stacked structure comprising a same first conductive layer and a same first photosensitive organic layer between a first surface of the thin film and the first conductive layer, the nanowire sensing cells comprising:

first nanowire sensing cells connected to each other in rows in the row direction; and second nanowire sensing cells electrically insulated from the first nanowire sensing cells and connected to each other in columns in the column direction;

first nanowire connecting lines connecting row-wise adjacent said first nanowire sensing cells to each other;

second nanowire connecting lines connecting column-wise adjacent said second nanowire sensing cells to each other;

sensing lines in the non-active area on the first surface of the thin film and connected to the rows of first nanowire sensing cells and the columns of second nanowire sensing cells; and an insulating layer at crossing regions of the first and second nanowire connecting lines, wherein the first nanowire connecting lines are on the insulating layer and comprise a second stacked structure of a second conductive layer and a second photosensitive organic layer.

12. The flexible touch screen panel according to claim 11, wherein the second conductive layer comprises silver nanowire (AgNW).

13. The flexible touch screen panel according to claim 11, wherein the first conductive layer is patterned in a region between the first and second nanowire sensing cells to expose the first photosensitive organic layer.

* * * * *